United States Patent
Kume et al.

(10) Patent No.: US 8,676,420 B2
(45) Date of Patent: Mar. 18, 2014

(54) ELECTRIC VEHICLE AND METHOD FOR CONTROLLING THE SAME

(75) Inventors: Yohei Kume, Osaka (JP); Shohei Tsukada, Osaka (JP); Hideo Kawakami, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 114 days.

(21) Appl. No.: 13/275,555

(22) Filed: Oct. 18, 2011

(65) Prior Publication Data

US 2012/0095633 A1    Apr. 19, 2012

(30) Foreign Application Priority Data

Oct. 19, 2010   (JP) .................................. 2010-234308
Sep. 16, 2011   (JP) .................................. 2011-202899

(51) Int. Cl.
G05D 1/02      (2006.01)
G01S 17/93     (2006.01)
A61G 5/04      (2013.01)

(52) U.S. Cl.
USPC ........................................... 701/22; 701/301

(58) Field of Classification Search
USPC .................................................. 701/22, 301
See application file for complete search history.

(56) References Cited

U.S. PATENT DOCUMENTS 4,802,096 A * 1/1989 Hainsworth et al. ........... 701/301
5,006,988 A * 4/1991 Borenstein et al. ............. 701/25
5,461,357 A * 10/1995 Yoshioka et al. .............. 340/435
7,204,328 B2 * 4/2007 LoPresti ........................ 180/6.5

FOREIGN PATENT DOCUMENTS

| JP | 01-197148 | * | 8/1989 | ............... B60R 21/00 |
|---|---|---|---|---|
| JP | 07-110711 A | * | 4/1995 | ............... G05D 1/02 |
| JP | 2003033405 A | * | 2/2003 | ............... A61G 5/04 |
| JP | 2005293154 A | * | 10/2005 | ............... G05D 1/02 |
| JP | 2007-55480 | | 3/2007 | |
| JP | 2008049932 A | * | 3/2008 | ............... B60T 7/12 |
| JP | 2008049959 A | * | 3/2008 | ............... B60T 21/00 |
| JP | 2008-296900 | | 12/2008 | |
| WO | WO 2010140321 A1 | * | 12/2010 | ............... B62B 3/00 |

OTHER PUBLICATIONS

JPO machine translation of JP 2008-49932 (original JP document published Mar. 6, 2008).*
JPO machine translation of JP 2005-293154 (original JP document published Oct. 20, 2005).*

(Continued)

*Primary Examiner* — James Trammell
*Assistant Examiner* — David Testardi
(74) *Attorney, Agent, or Firm* — Wenderoth, Lind & Ponack, L.L.P.

(57) ABSTRACT

An electric wheelchair includes a body portion, an operating section to detect an operation by an operator, an obstacle sensor to detect an obstacle existing in the vicinity of the body portion, an obstacle determination section to form a search region extending from the body portion in an operating direction, and to determine an obstacle existing in the search region, as the obstacle to be avoided, a virtual repulsive force calculation section to calculate a virtual repulsive force to move the body portion away from the obstacle determined by the obstacle determination section, a resultant force calculation section to calculate a resultant force composed of an operating force and the virtual repulsive force, and a control section to control a movement of the body portion so that the body portion is moved in a direction of the resultant force.

18 Claims, 10 Drawing Sheets

(56) References Cited

OTHER PUBLICATIONS

JPO machine translation of JP 07-110711 (original JP document published Apr. 25, 1995).*

Antich, Javier et al., "Extending the Potential Fields Approach to Avoid Trapping Situations", 2005 IEEE/RSJ International Conference on Intelligent Robots and Systems (IROS 2005), Aug. 2-6, 2005, 6 pages.*

Borenstein, J. et al., "The vector field histogram-fast obstacle avoidance for mobile robots", IEEE Journal of Robotics and Automation vol. 7, No. 3, Jun. 1991, pp. 278-288.*

Lankenau, A. et al., "A versatile and safe mobility assistant", IEEE Robotics and Automation Magazine 7, No. 1, Mar. 2001, pp. 29-37.*

Seki, Hiroaki et al., "Real-time obstacle avoidance using potential field for a nonholonomic vehicle", published as Chapter 26 in "Factory Automation", edited by Javier Silvestre-Blanes, ISBN 978-953-307-024-7, on Mar. 1, 2010, pp. 523-542.*

Simpson, Richard, et al., "The Smart Wheelchair Component System", Journal or Rehabilitation Research & Development, vol. 41 No. 3B, May/Jun. 2004, pp. 429-442.*

Japanese Office Action issued Sep. 11, 2012 in counterpart Japanese Application No. 2011-202899, (in Japanese).

* cited by examiner

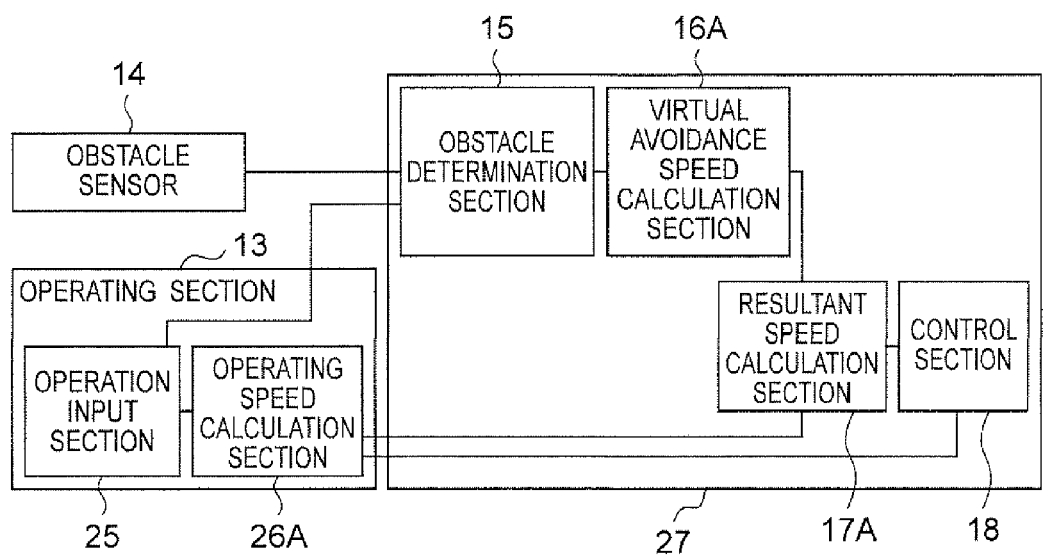

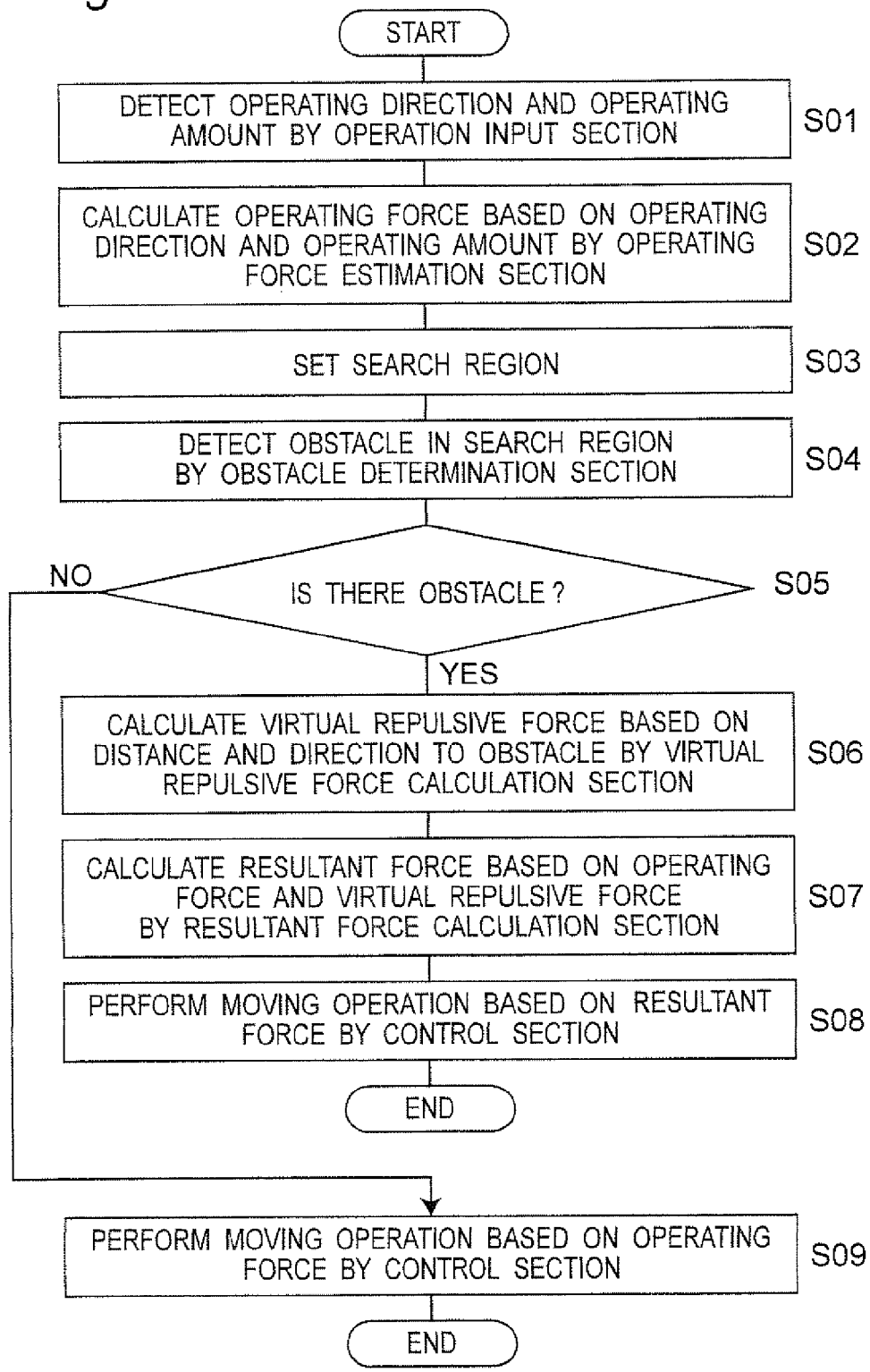

ELECTRIC VEHICLE AND METHOD FOR CONTROLLING THE SAME

RELATED ART

The present invention relates to an electric vehicle to automatically avoid an obstacle which impedes the electric vehicle from traveling, and a method for controlling the same.

Electric wheelchairs which can be easily moved only by handling an operation input portion such as a lever are used in hospitals and care facilities. In addition, power assisted carts which can be easily moved only by pressing an operation input portion such as a handle are used in factories and commercial facilities.

The electric wheelchair and the power assisted cart are only one example of the electric vehicle, and when a user who is not familiar with its operation operates the electric vehicle, the electric vehicle may collide with an obstacle existing in a moving direction, due to an erroneous operation or the like. Thus, when an obstacle exists in the vicinity of the moving direction, the electric vehicle is required to automatically avoid the obstacle.

Thus, a two-wheel independent power assisted cart is proposed, which avoids an obstacle when the cart finds the obstacle during its travel.

FIG. 8 is a view showing a conventional power assisted cart 1 which avoids an obstacle 2. According to the power assisted cart 1, a control section 3 measures an operating force $F_{ope}$ composed of an amount and a direction of an operation applied to a steering handle 4, in order to travel while avoiding the obstacle 2. Furthermore, a virtual repulsive force $F_{obj}$ is calculated to move a body portion 5 of the power assisted cart 1 away from the obstacle 2, based on a distance and a direction to the obstacle 2 which are detected by obstacle sensors 6a, 6b, and 6c. Thus, a resultant force $F_{move}$ ($=F_{ope}+F_{obj}$) is multiplied by an assist rate $K_a$ to calculate an assist force $F_a$ ($=K_a \cdot F_{move}$), and a drive section (not shown) to move drive steering wheels 7 is controlled based on the assist force $F_a$. In addition, flexible wheels 8 support the body portion 5 together with the drive steering wheels 7.

In this way, by controlling the drive steering wheel 7 based on the assist force $F_a$, the power assisted cart 1 automatically avoids the obstacle 2 even when an operator does not perform a turning operation.

FIG. 9 is a view showing the conventional power assisted cart 1 which is about to pass between an obstacle 9a and an obstacle 9b provided as walls. According to the conventional power assisted cart 1, when the power assisted cart 1 passes between the obstacle 9a and the obstacle 9b shown in FIG. 9, the power assisted cart 1 cannot pass between the obstacle 9a and the obstacle 9b in some cases. More specifically, even when a width between the obstacle 9a and the obstacle 9b is wide enough for the body portion 5 to pass, the power assisted cart 1 is pushed back by the great virtual repulsive force $F_{obj}$ and cannot pass between the obstacle 9a and the obstacle 9b in some cases. However, when the power assisted cart 1 is used, the situation in which the power assisted cart 1 passes through a door provided between walls serving as the obstacles 9a and 9b is often generated.

As one of measures against the situation, there is a method of calculating the assist force $F_a$ with the virtual repulsive force $F_{obj}$ limited when the operating force $F_{ope}$ acting on the steering handle 4 exceeds a predetermined level, so that the power assisted cart 1 can pass between the obstacles 9a and 9b (refer to Japanese Unexamined Patent Publication No. 2007-55480). Thus, by limiting the magnitude of the virtual repulsive force $F_{obj}$, the conventional power assisted cart 1 can pass between the obstacle 9a and the obstacle 9b.

SUMMARY OF THE INVENTION

It is an object of the present invention to provide an electric vehicle capable of safely avoiding an obstacle, and a method for controlling the electric vehicle.

In accomplishing these and other aspects, according to a first aspect of the present invention, there is provided an electric vehicle comprising: a body potion; an operating section; an obstacle sensor; an obstacle determination section; a control section.

The operating section detects an operating direction of an inputted operation.

The obstacle sensor detects obstacles existing in a vicinity of the body portion.

The obstacle determination section forms a search region extending from the body portion in the operating direction and determines an obstacle existing in the search region among obstacles detected by the obstacle sensor, as the obstacle to be avoided.

The control section controls a movement of the body portion so that the body portion avoids the obstacle to be avoided, determined by the obstacle determination section.

According to another aspect of the present invention, there is provided a method for controlling an electric vehicle having an obstacle sensor and an operating section, comprising:

detecting a periphery of a body portion by the obstacle sensor;

detecting an operating direction of an operation inputted to the operating section by the operating section;

forming a search region extending from the body portion in the operating direction by an obstacle determination section, and determining an obstacle existing in the search region among obstacles detected by the obstacle sensor, as the obstacle to be avoided, by the obstacle determination section; and controlling a movement of the body portion by a control section so that the body portion avoid the obstacle when it is determined that there is the obstacle in the search region by the obstacle determination section in determining the obstacle.

BRIEF DESCRIPTION OF THE DRAWINGS

These and other aspects and features of the present invention will become clear from the following description taken in conjunction with the embodiments thereof with reference to the accompanying drawings, in which:

FIG. 1C is a block diagram of an operating section and a control section of an electric wheelchair according to a variation of the first embodiment;

FIG. 3 is a control flowchart performed by a control circuit section according to the first embodiment;

DESCRIPTION OF THE EMBODIMENTS

Figure 1A:
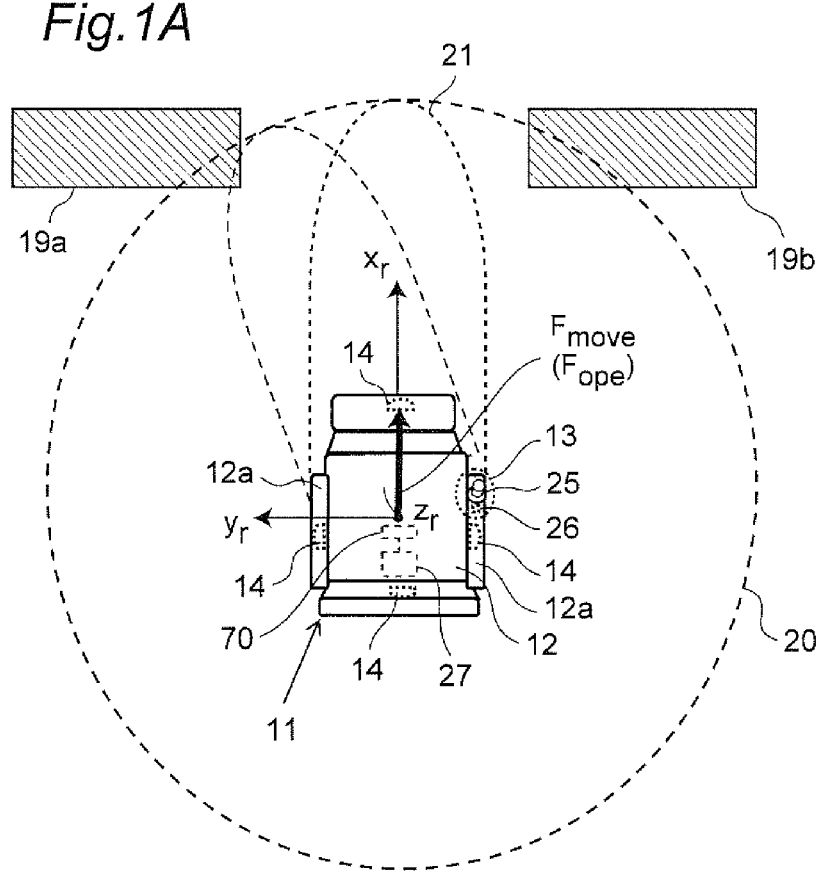
FIG. 1A is a plan view showing a state in which an electric wheelchair according to a first embodiment of the present invention is about to pass between an obstacle and an obstacle.

Hereinafter, embodiments of the present invention will be described with reference to the drawings. In addition, the same reference is allocated to the same component and its description is occasionally omitted. Furthermore, the component is schematically shown as a main body in the drawing for easy understanding.

First Embodiment

Figure 1B:
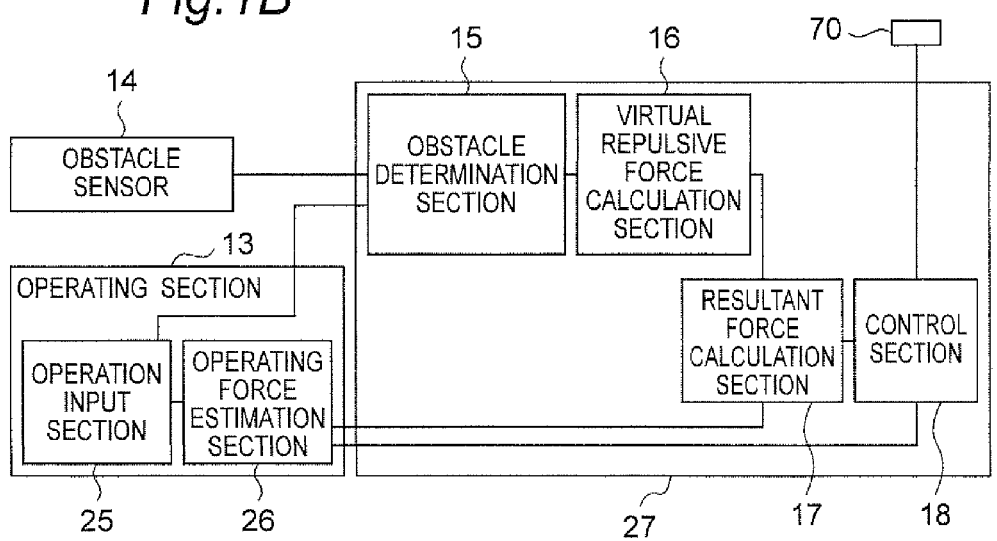
FIG. 1B is a block diagram of an operating section and a control section of the electric wheelchair according to the first embodiment.
Figure 2:
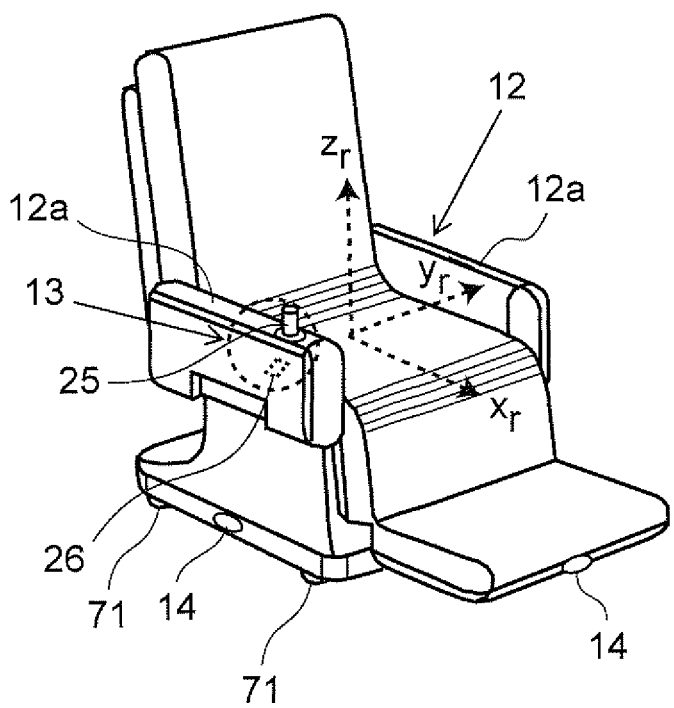
FIG. 2 is a perspective view of the electric wheelchair according to the first embodiment.

FIGS. 1A and 15 are views showing an electric wheelchair 11 in a planar manner as one example of an electric vehicle of a first embodiment of the present invention. FIG. 1A is a planar view showing the electric wheelchair 11 which is about to pass between an obstacle 19a and an obstacle 19b, and FIG. 1B is a block diagram of an operating section and a control section. FIG. 1C is a block diagram of an operating section and a control section of an electric wheelchair according to a variation of the first embodiment, and thus it will be described later. FIG. 2 is a perspective view of the electric wheelchair 11. In addition, for easy understanding, a vehicle coordinate system $\Sigma r$ (coordinate system having three mutually orthogonal axes such as $x_r$ axis, $y_r$ axis, and $z_r$ axis) moving together with the motion of the electric wheelchair 11 is set in FIGS. 1A and 2. It is assumed that a plane composed of the $x_r$ axis and the $y_r$ axis is a horizontal plane parallel to a ground surface, and the $x_r$ axis is directed anterior to the electric wheelchair 11.

The electric wheelchair 11 shown in FIGS. 1A and 2 is an omnidirectional electric vehicle, that is, the electric wheelchair 11 can be moved in all directions without changing its posture itself (the electric wheelchair 11 itself). The electric wheelchair 11 is moved based on a magnitude and a direction of an operation performed by an operator who is a rider of the electric wheelchair 11. In addition, the term "posture itself" means a posture in which the electric wheelchair 11 faces forward, more specifically, corresponding to the $x_r$ axis. That is, the term "electric wheelchair 11 can be moved in all directions without changing its posture" means that the electric wheelchair 11 can be moved in all directions along the horizontal plane around the electric wheelchair 11 without changing the direction of the electric wheelchair 11. In addition, it is assumed that an operating force, a virtual repulsive force, and a resultant force are generated based on an original point of the vehicle coordinate system $\Sigma r$ for easy understanding.

The electric wheelchair 11 according to the first embodiment is moved in a direction inputted to an operating section 13 which will be described later by the operator (hereinafter, this direction is referred to as the "operating direction"). However, when there is an obstacle in the operating direction, a virtual repulsive force $F_{obj}$ is generated so as to avoid the obstacle, and the electric wheelchair 11 is moved in a direction different from the operating direction in order to avoid the obstacle.

First, a configuration of the electric wheelchair 11 will be described.

The electric wheelchair 11 includes a body portion 12, the operating section 13 to detect an operating force $F_{ope}$ based on the operation by the operator, obstacle sensors 14, and a control circuit section 27.

The control circuit section 27 includes an obstacle determination section 15, a virtual repulsive force calculation section 16 to calculate the virtual repulsive force $F_{obj}$, a resultant force calculation section to calculate a resultant force $F_{move}$ composed of the operating force $F_{ope}$ and the virtual repulsive force $F_{obj}$, and a control section 18 to control a motor to move the body portion 12 in a direction of the resultant force $F_{move}$.

Four motors are set in the vicinity of four corners of a bottom surface of the body portion 12. In addition, in FIG. 1A, the four motors are simplified and shown as a rectangular drive source (drive device) 70. An omnidirectional wheel serving as one example of a wheel 71 which can be moved in all directions is mounted on a drive shaft of each of the four motors. Thus, the control section 18 controls the motors individually, so that the body portion 12 can be moved in all directions such as a back-and-forth direction, a right-and-left direction, or an oblique direction.

The operating section 13 has an operation input portion 25 to detect an operating direction and an operating amount operated by the operator, and an operating force estimation section 26 to calculate the operating force based on the operating direction and the operating amount detected in the operation input portion 25. According to the first embodiment, as one example of the operation input portion 25, a joystick is provided in an armrest portion 12a of the body portion 12. The operating direction can be detected by a direction taken down from an upright position in the operation input portion 25, and the operating amount is detected by measuring an angle from the upright position. Here, the operating direction is a direction in which the operator wants the body portion 12 to be moved. The operating force estimation section 26 calculates a magnitude of the operating force by multiplying magnitude of the operating amount of the operation input portion 25 by an assist rate. In addition, in a case where a force sensor which directly detects the force is used as the operation input portion 25, the operating force $F_{ope}$ may be directly calculated by a calculation section of the force sensor based on the force detected by the force sensor without using the operating force estimation section 26. In addition, the operating force estimation section 26 may be provided in the control circuit section 27 instead of being provided in the operating section 13.

The obstacle sensors 14 are arranged around a lower part of the body portion 12 of the electric wheelchair 11 and detect the obstacle existing in the vicinity of the body portion 12. For example, the obstacle sensor 14 is arranged in each of four sides of the body portion 12 (a center of a front portion, a center of each side, and a center of a rear portion of the body portion 12). Thus, the obstacle sensors 14 form a circular obstacle sensor region 20 to detect the obstacle existing in a front part, both side parts, and a rear part. According to the first embodiment, as one example of the obstacle sensor 14, a laser range finder is used, and the laser range finder detects a distance and a direction from the body portion 12 to the obstacle. As shown in FIG. 1A, as the obstacle sensors 14 form the circular obstacle sensor region 20 which surrounds a periphery of the body portion 12, the obstacle sensors 14 can detect the obstacle existing around the body portion 12. In addition, the obstacle sensor region 20 of the electric wheelchair 11 according to the first embodiment is a column-shaped region having a radius of 4 m.

The obstacle determination section 15 forms a search region 21 extending from the body portion 12 in the operating direction detected by the operation input portion 25 based on the operating direction detected by the operation input portion 25, and determines that the obstacle existing in the search region 21 formed based on the detection information from the obstacle sensors 14 is an obstacle to be avoided. In addition, the search region 21 is formed in the same direction (operating direction) as the direction of the operating force $F_{ope}$. That is, when the operator changes the operating direction, the direction of the search region 21 to be formed is also changed by the obstacle determination section 15 according to the changed operating direction. For example, when the operator operates the operation input portion 25 diagonally forward left of the body portion 12, the obstacle determination section 15 forms the search region 21 diagonally forward left of the body portion 12 which is the same direction as the operating direction.

The search region 21 is a part of the obstacle sensor region 20. Thus, with respect to the obstacle which has been detected in the obstacle sensor region 20 by the obstacle sensor 14, the obstacle determination section 15 determines whether or not the obstacle exists in the search region 21. More specifically, the determination whether or not the obstacle exists in the search region 21 is made by the obstacle determination section 15 based on the distance and direction from the body portion 12 to the obstacle.

The virtual repulsive force calculation section 16 calculates the virtual repulsive force $F_{obj}$ to move the body portion 12 away from the obstacle which has been determined as the obstacle to be avoided by the obstacle determination section 15. Here, the virtual repulsive force $F_{obj}$ is inversely proportional to the distance to the obstacle detected by the obstacle sensor 14, and generated in a direction opposite to the obstacle.

The resultant force calculation section 17 calculates the resultant force $F_{move}$ composed of the operating force $F_{ope}$ inputted from the operating section 13 and the virtual repulsive force $F_{obj}$ calculated by the virtual repulsive force calculation section 16. A direction of the resultant force $F_{move}$ at this time is the moving direction of the electric wheelchair 11. In addition, a value provided by multiplying magnitude of the resultant force $F_{move}$ by a conversion factor represents a desired moving speed of the electric wheelchair 11.

The control section 18 controls the drive source 70, that is, the motors so as to move the body portion 12 in the direction of the resultant force $F_{move}$ calculated by the resultant force calculation section 17.

The electric wheelchair 11 described in the first embodiment, as shown in FIG. 1A, in the case where the search region 21 is formed between the obstacle 19a and the obstacle 19b, can pass between the obstacle 19a and the obstacle 19b even when the obstacles 19a and 19b are contained in the obstacle sensor region 20. That is, when the operator sets the direction (operating direction) to move the electric wheelchair 11 between the obstacle 19a and the obstacle 19b with the operation input portion 25, the obstacle determination section 15 forms the search region 21 extending from the body portion 12 in the operating direction. Thus, as long as the obstacle does not exist in the search region 21, the electric wheelchair 11 can be moved in the operating direction. As a result, the electric wheelchair 11 can pass between the obstacle 19a and the obstacle 19b without setting limits on the virtual repulsive force $F_{obj}$ unlike a conventional case. In addition, in a case where the operating section 13 is operated toward the obstacle by mistake, the search region 21 is formed in the operated operating direction, so that it means that the obstacle exists in the search region 21. Therefore, the virtual repulsive force to move the body portion 21 away from the obstacle is generated, so that the body portion 12 can be prevented from colliding with the obstacle.

In addition, the obstacle determination section 15 forms the region extending from the body portion 12 in the operating direction and having roughly the same width as that of the body portion 12, as the search region 21. Here, as the search region 21 having roughly the same width as that of the body portion 12, the width is larger than the width of the body portion 12 by about 50%, for the sake of safety. For example, when the width of the body portion 12 is 60 cm, the search region 21 has the width of 90 cm.

On the basis of the search region 21 generated as described above, when the distance between the obstacle 19a and the obstacle 19b is smaller than the width of the body portion 12 at the moment the body portion 12 passes between the obstacle 19a and the obstacle 19b, the obstacle determination section 15 calculates the virtual repulsive force $F_{obj}$ with respect to the obstacle, and prevents the electric wheelchair 11 from passing through the space which is smaller than the width of the electric wheelchair 11. Meanwhile, when the distance between the obstacle 19a and the obstacle 19b is larger than the width of the body portion 12, the search region 21 is formed between the obstacle 19a and the obstacle 19b, so that the electric wheelchair 11 can pass between the obstacle 19a and the obstacle 19b without generating the virtual repulsive force.

Next, a description will be made of a control method when the electric wheelchair 11 is moved.

FIG. 3 is a control flowchart executed in the control circuit section 27 in the first embodiment.

First, in step S01, when the operator handles the operation input portion 25 under the condition that the electric wheelchair 11 is operated, the operating direction and the operating amount are detected by the operation input portion 25.

Then, in step S02, the operating force $F_{ope}$ is calculated by the operating force estimation section 26, based on the operating direction and operating amount detected by the operation input portion 25.

Then, in step S03, the search region 21 is formed in the obstacle sensor region 20 of the obstacle sensor 14 by the obstacle determination section 15, based on the operating direction detected in step S01.

Then, in step S04, the obstacle sensor region 20 in the vicinity of the electric wheelchair 11 is sensed by all of the obstacle sensors 14 to detect the obstacle.

Then, in step S05, whether or not there is the obstacle in the search region 21 extending from the body portion 12 in the operating direction is determined by the obstacle determination section 15, based on the detected obstacle information.

Then, in step S05, when it is determined that the obstacle exists in the search region 21 ("YES" in step S5), the operation proceeds to step S06. Meanwhile, in step S05, when it is determined that the obstacle does not exist in the search region 21 ("NO" in step S5), the operation proceeds to step S09.

In step S06, the virtual repulsive force $F_{obj}$ is calculated by the virtual repulsive force calculation section 16 based on the distance and the direction to the obstacle detected by the obstacle sensor 14. The virtual repulsive force calculation section 16 calculates the virtual repulsive force $F_{obj}$ which is inversely proportional to the distance to the obstacle, and generated in the direction opposite to the obstacle.

Then, in step S07, the resultant force $F_{move}$ composed of the operating force $F_{ope}$ and the virtual repulsive force $F_{obj}$ is calculated by the resultant force calculation section 17. The direction of the resultant force $F_{move}$ at this time is the moving direction of the electric wheelchair 11, and the value calculated by multiplying a magnitude of the resultant force $F_{move}$ by the conversion factor is the desired moving speed of the electric wheelchair 11. In addition, according to the first embodiment, an apparent viscosity coefficient regarding the moving operation of the electric wheelchair 11 is set and 1/D (viscosity coefficient) is used as the conversion factor. That is, the desired moving speed is calculated by multiplying the resultant force $F_{move}$ by the 1/D (viscosity coefficient) by the resultant force calculation section 17, and its magnitude is proportional to the magnitude of the resultant force $F_{move}$ and its direction coincides with the direction of the resultant force $F_{move}$.

Then, in step S08, the drive source 70 is controlled by the control section 18, based on the resultant force $F_{move}$ calculated by the resultant force calculation section 17, whereby the electric wheelchair 11 is moved. Alternatively, magnitude of the resultant force $F_{move}$ may be set by the resultant force calculation section 17 as an impellent force to be applied to the electric wheelchair 11, and then the electric wheelchair 11 may be moved by the control section 18 based on the impellent force.

Thus, according to the electric wheelchair 11 described in the first embodiment, when the obstacle is detected in the search region 21 by the obstacle determination section 15, the virtual repulsive force $F_{obj}$ is generated by the virtual repulsive force calculation section 16. Based on the virtual repulsive force $F_{obj}$, the electric wheelchair 11 is moved so as to avoid the obstacle by the control section 18 through the resultant force calculation section 17.

When it is determined that there is no obstacle in step S05 ("NO" in S5), the drive source 70 is controlled by the control section 18 based on the operating force $F_{ope}$ and the body portion 12 is moved in step S09. In addition, in this case, since the obstacle is not detected in the search region 21, it is determined that there is no obstacle in the operating direction by the obstacle determination section 15, and the virtual repulsive force $F_{obj}$ is not generated.

Thus, step S01 to step S09 are repeated by the control circuit section 27, whereby the movement of the electric wheelchair 11 is controlled.

That is, the electric wheelchair 11 according to the first embodiment is controlled by the obstacle detecting step (step S03), the obstacle determining step (step S05), the controlling step (steps S06 to S08), and the driving step (step S09). More specifically, according to the obstacle detecting step (step S03), the obstacle determination section 15 forms the search region 21 extending from the body portion 12 in the operating direction detected by the operating section 13, in the obstacle sensor region 20, and then the obstacle sensor 14 detects the obstacle in the search region 21. In addition, according to the obstacle determining step (step S05), the obstacle determination section 15 determines the obstacle existing in the search region 21 as the obstacle to be avoided. In addition, according to the control step (step S06 to S08), if the obstacle determination section 15 determines that the obstacle exists in the search region 21 in the obstacle determining step, the control section 18 controls the drive source 70 so as to avoid the obstacle. Furthermore, according to the driving step (step S09), in a case where the obstacle determination section 15 determines that the obstacle does not exist in the search region 21, the control section 18 controls the drive source 70, that is, the motors based on the operating force. Thus, the electric wheelchair 11 according to the first embodiment can automatically and safely avoid the obstacle even if the obstacle exists in the operating direction.

In addition, according to the obstacle determination section 15 of the electric wheelchair 11 of the first embodiment, the length of the search region 21 in the operating direction may be changed depending on the magnitude of the operating amount in the operation input portion 25 operated by the operator, or the magnitude of the operating force detected by the operation input portion 25 or calculated by the operating force estimation section 26. By changing the search region 21 as described above, the automatic avoidance can be finely controlled, so that the obstacle can be avoided with safety highly ensured. That is, when the operating amount or the operating force is great, the impellent force of the electric wheelchair 11 is great, or the moving speed is high, so that there is a possibility that a collision occurs with a distant obstacle. In this case, it is preferable that the length of the search region 21 in the operating direction is elongated so that the obstacle determination section 15 can determine that the distant obstacle is also to be avoided. Meanwhile, when the operating amount or the operating force is small, the impellent force of the electric wheelchair 11 is small, or the moving speed is low, so that there is no possibility that the collision occurs with the distant obstacle, but there is a possibility that the collision occurs with the near obstacle. In this case, it is preferable that the length of the search region 21 in the operating direction is shortened so that the obstacle determination section 15 can determine that only the near obstacle with which the collision could occur is to be avoided.

In addition, the obstacle determination section of the electric wheelchair 11 according to the first embodiment may have a configuration in which a shape of the search region 21 (such as a width of the search region 21) is changed depending on the magnitude of the operating amount or the operating force. Thus, by changing the shape of the search region 21, the automatic avoidance can be finely controlled, so that the obstacle can be avoided with safety highly ensured. Thus, when the operating amount or the operating force is great, the operator is thought to intend to move in a certain desired direction. Thus, it is preferable to sharply form the search region 21 toward the operating direction so that the obstacle determination section 15 can determine only the obstacle existing in the operating direction in which the operator tries to move, as the obstacle to be avoided. Meanwhile, when the operating amount or the operating force is small, the operator is thought to be about to position the body portion 12, or move in a narrow place. Therefore, it is preferable to form the search region 21 in all directions so that the obstacle determination section 15 can determine obstacles existing in all directions as the obstacle to be avoided.

In addition, according to the electric wheelchair of the first embodiment, the obstacle determination section 15 forms the region extending from the body portion 12 and being tapered toward the operating direction as the search region 21. In this configuration, with respect to the distant obstacle, only the vicinity of a center line of the search region 21 having a high possibility for the collision is detected, so that the virtual repulsive force $F_{obj}$ can be prevented from being generated by the virtual repulsive force calculation section 16 beyond necessity.

In addition, according to the electric wheelchair 11 of the first embodiment, the resultant force calculation section 17 may calculate a resultant force composed of the operating force $F_{ope}$, and a component in the operating force direction and a vertical component of the virtual repulsive force $F_{obj}$, as the resultant force $F_{move}$. In this case, the obstacle can be avoided while the moving operation in the direction operated by the operator is not hindered.

In addition, a description has been made of the omnidirectional electric wheelchair 11 as one example of the electric vehicle in the above, but the present invention is not limited to the omnidirectional electric wheelchair. For example, although the movement of the electric vehicle itself is limited, the contents of the present invention described above can be applied to a two-wheel independent electric wheelchair as another example of the electric vehicle. In addition, the electric wheelchair 11 is used as one example of the electric vehicle in the above, but it is considered that the contents of the present invention can also be applied to a power assisted cart as further another example of the electric vehicle by accordingly changing the settings.

In addition, the above contents of the present invention may be applied to a speed-based control system instead of being applied to the power-based control system which is moved based on the operating force and the virtual repulsive force. That is, the above contents may be applied to an electric vehicle which is moved based on an operating speed and an avoidance speed, instead of being moved based on the operating force and the virtual repulsive force. In this case, as shown in FIG. 1C, preferably, an operating speed calculation section 26A is provided to calculate an operating speed based on the operating amount of the operating section 13 instead of the operating force estimation section 26, a virtual avoidance speed calculation section 16A is provided to calculate a virtual avoidance speed, instead of the virtual repulsive force calculation section 16, and a resultant speed calculation section 17A is provided to calculate a resultant speed composed of the operating speed and the virtual avoidance speed, instead of the resultant force calculation section 17.

The above electric vehicle of the speed-based control system includes the body portion 12, the operation input portion 25, the operating speed calculation section 26A, the obstacle sensors 14, the obstacle determination section 15, the virtual avoidance speed calculation section 16A, the resultant speed calculation section 17A, and the control section 18. Here, the operation input portion 25 is provided in the body portion 12 to detect an operating direction and an operating amount operated by the operator. The operating speed calculation section 26A calculates an operating speed based on the operating direction and the operating amount detected by the operation input portion 25. The obstacle sensor 14 detects a distance and a direction from the body portion 12 to the obstacle as the detection values. The obstacle determination section 15 forms the search region 21 extending from the body portion 12 in the operating direction and determines the obstacle existing in the search region 21 as the obstacle to be avoided. The virtual avoidance speed calculation section 16A calculates the virtual avoidance speed to move the body portion 12 away from the obstacle which is determined by the obstacle determination section 15. The resultant speed calculation section 17A calculates the resultant speed composed of the operating speed and the virtual avoidance speed. The control section 18 controls the electric wheelchair 11 so that the electric wheelchair 11 can be moved in the direction of the resultant speed calculated by the resultant speed calculation section 17A. The operating speed calculation section 26A calculates the operating speed by multiplying the operating amount of the operation input portion 25 by the conversion factor. The virtual avoidance speed calculation section 16A may calculate the virtual avoidance speed which is inversely proportional to the distance to the obstacle and is to move the electric wheelchair in a direction opposite to the obstacle, with respect to the obstacle determined by the obstacle determination section 15.

Thus, the case where the electric wheelchair 11 is controlled by the control section based on the resultant speed composed of the virtual avoidance speed and the operating speed has an advantage in that the control can be easily performed as compared with the case where the electric wheelchair 11 is controlled by the control section based on the resultant force composed of the virtual repulsive force and the operating force. This is because torque control which can also execute complicated control but not be easily conducted is used in the case of the virtual repulsive force, while the speed control which is easily conducted is used in the case of the virtual speed. In addition, almost all commercially-available electric wheelchairs use the speed control.

In addition, according to the first embodiment, when the resultant force $F_{move}$ is calculated in the resultant force calculation section 17, the virtual repulsive force $F_{obj}$ may be multiplied by a gain of 0 to 1 in the resultant force calculation section 17. This gain is 0 when the operator does not handle the operation input portion 25 and the operating force $F_{ope}$ is 0. Thus, as the operator handles the operation input portion 25 and the operating force $F_{ope}$ increases, the gain gradually increases from 0, and when the operating force $F_{ope}$ reaches the maximum, the gain becomes 1. Thus, by multiplying the gain in the resultant force calculation section 17, when the operator does not handle the operation input portion 25, the resultant force $F_{move}$ is calculated as 0 in the resultant force calculation section 17 even when there is the obstacle at a short distance. Thus, when not being intend to move, the electric wheelchair 11 does not move by itself. Thus, when the operator intends to handle the operation input portion 25, the obstacle avoiding operation is performed based on its magnitude. That is, when the operator intends to move the electric wheelchair, the operation according to the intended magnitude can be performed, so that safer operation can be performed.

Second Embodiment

Figure 4A:
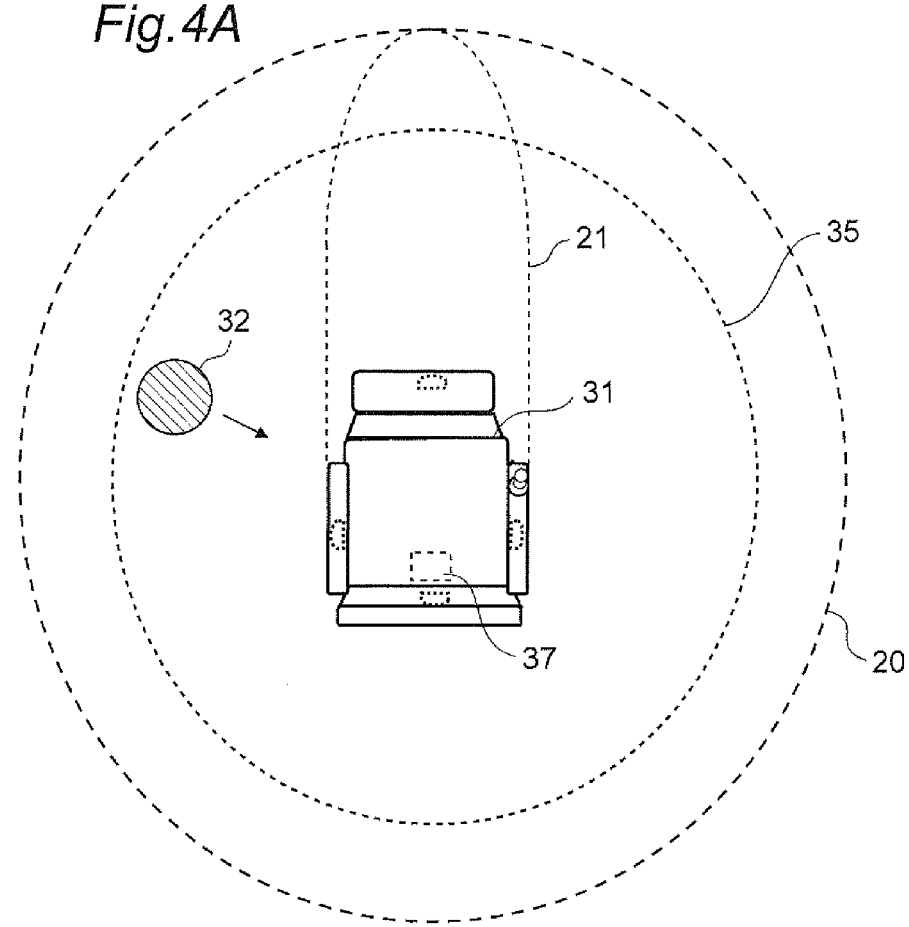
FIG. 4A is a plan view showing a state in which a dynamic obstacle is coming close to an electric wheelchair according to a second embodiment of the present invention.
Figure 4B:
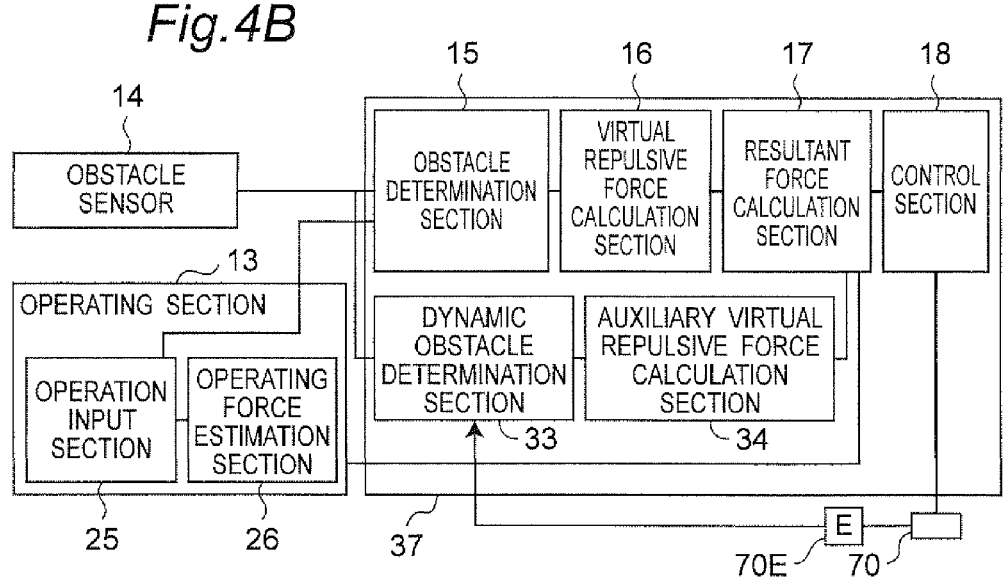
FIG. 4B is a block diagram of an operating section and a control section of the electric wheelchair according to the second embodiment.

FIGS. 4A and 4B are views showing an electric wheelchair 31 according to a second embodiment of the present invention. FIG. 4A is a view showing the electric wheelchair 31 to which a dynamic obstacle 32 is coming close, and FIG. 42 is a block diagram of an operating section and a control section.

According to the electric wheelchair 31 of the second embodiment, when the dynamic obstacle 32 which moves by itself such as a person or a small animal comes close to the electric wheelchair 31, an auxiliary virtual repulsive force is generated by an auxiliary virtual repulsive force calculation section 34. Thus, based on this auxiliary virtual repulsive force, the electric wheelchair 31 is driven and controlled by the control section 18 through the resultant force calculation section 17 to automatically avoid the dynamic obstacle 32. That is, the electric wheelchair 31 according to the second embodiment has a dynamic obstacle search region 35 to detect the dynamic obstacle 32, in addition to the search region 21 to detect the static obstacle. Here, the static obstacle means a fixed obstacle such as a wall.

The electric wheelchair 31 according to the second embodiment has a control circuit section 37 instead of the control circuit section 27 of the electric wheelchair 11 according to the first embodiment. The control circuit section 37 further has a dynamic obstacle determination section 33, and the auxiliary virtual repulsive force calculation section 34 in addition to the configuration of the control circuit section 27, and the resultant force calculation section 17 calculates the resultant force composed of an operating force, a virtual repulsive force, and an auxiliary virtual repulsive force.

Thus, the dynamic obstacle determination section forms a circular dynamic obstacle search region 35 around a center of the body portion 12, based on the detected information from the obstacle sensor 14, and determines the dynamic obstacle 32 existing in the dynamic obstacle search region 35, as the obstacle to be avoided. In addition, according to the second embodiment, the dynamic obstacle search region 35 is smaller than the obstacle sensor region 20, but it may be formed to have the same size as that of the obstacle sensor region 20.

The dynamic obstacle determination section 33 determines the object moving by itself in the dynamic obstacle search region 35 as the dynamic obstacle to be avoided. In addition, an object which does not move is not detected as the obstacle in the dynamic obstacle search region 35. The dynamic obstacle determination section 33 determines whether or not the obstacle is moving by itself by calculating a moving speed of the obstacle by calculating a difference in distance data to the obstacle obtained from the obstacle sensor 14 at every sampling time, using time information from an incorporated timer (not shown). When the dynamic obstacle determination section 33 determines that the obstacle is moving by itself, the dynamic obstacle determination section 33 detects the obstacle as the dynamic obstacle. That is, the moving speed of the obstacle is calculated to detect the dynamic obstacle which is moving by itself. Meanwhile, when the dynamic obstacle determination section 33 determines that the obstacle is not moving by itself, the dynamic obstacle determination section 33 does not detect the obstacle as the dynamic obstacle. In a case where the body portion 12 itself moves, a relative speed between the obstacle and the body portion 12 is calculated by the dynamic obstacle determination section 33, based on speed information obtained from encoders 705 mounted on rotation shafts of motors of the drive source 70 of the body portion 12, and whether or not the obstacle is moving is determined by the dynamic obstacle determination section 33 based on the calculated relative speed with the body portion 12.

When the dynamic obstacle determination section determines that the dynamic obstacle 32 has been detected, the auxiliary virtual repulsive force calculation section 34 calculates the auxiliary virtual repulsive force which is inversely proportional to the distance to the dynamic obstacle 32 and generated in a direction opposite to the dynamic obstacle 32.

In this configuration, when the dynamic obstacle 32 comes close to the electric wheelchair 31 as one example of the electric vehicle, the auxiliary virtual repulsive force is generated by the auxiliary virtual repulsive force calculation section 34, and the electric wheelchair 31 is driven and controlled based on the auxiliary virtual repulsive force and by the control section 18 through the resultant force calculation section 17, whereby the dynamic obstacle 32 can be automatically avoided. In addition, by separating the region to detect the static obstacle (obstacle not moving by itself) and the region to detect the dynamic obstacle, a size of the detection region for each of the static obstacle and the dynamic obstacle to be avoided can be changed. Thus, the obstacle can be efficiently and safely avoided according to the circumstance.

In addition, according to the second embodiment, when the dynamic obstacle 32 is detected, the auxiliary virtual repulsive force is calculated by the auxiliary virtual repulsive force calculation section 34 based on the distance and direction from the body portion 12 to the dynamic obstacle 32. However, the efficiency can be more improved by calculating the auxiliary virtual repulsive force by the auxiliary virtual repulsive force calculation section 34 with respect to the dynamic obstacle 32 which is coming close to the body portion 12, but not calculating the auxiliary virtual repulsive force by the auxiliary virtual repulsive force calculating section 34 with respect to the dynamic obstacle 32 which is moving away from the body portion 12. In addition, the auxiliary virtual repulsive force may be calculated by the auxiliary virtual repulsive force calculation section 34 based on the moving direction and a moving speed of the dynamic obstacle 32 as well. Under such control, the obstacle can be avoided under further fine control.

Third Embodiment

Figure 5A:
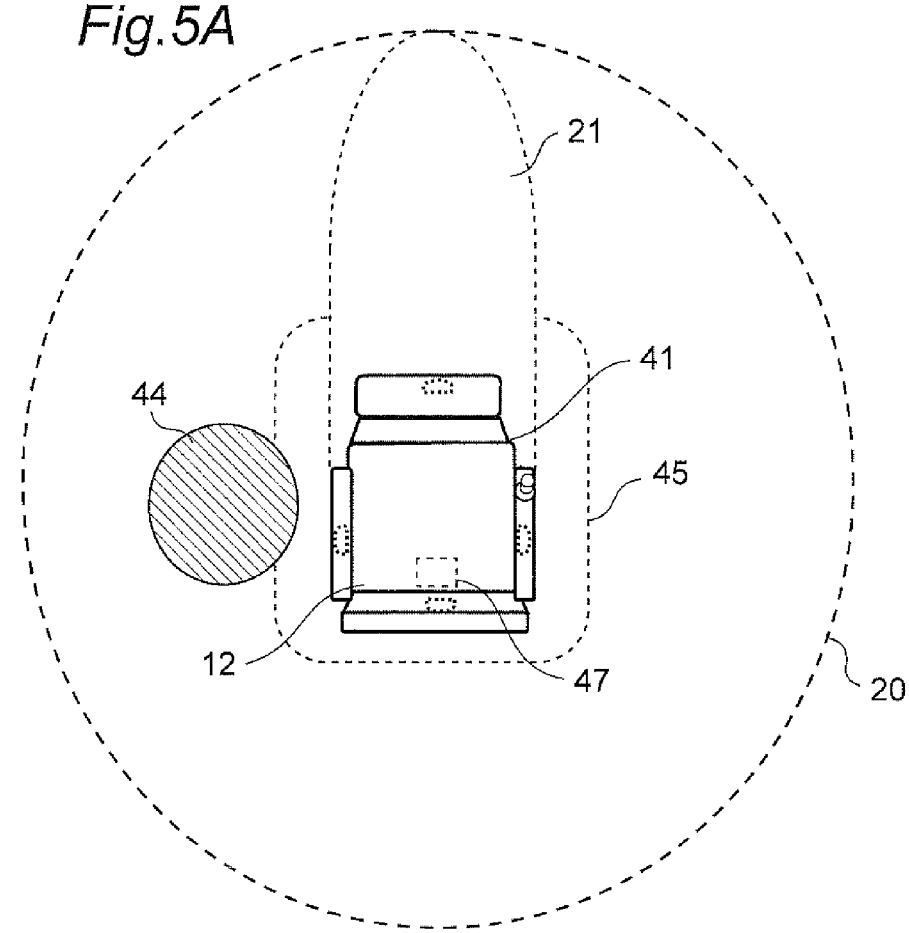
FIG. 5A is a view showing a state in which an electric wheelchair according to a third embodiment of the present invention is coming close to an obstacle.
Figure 5B:
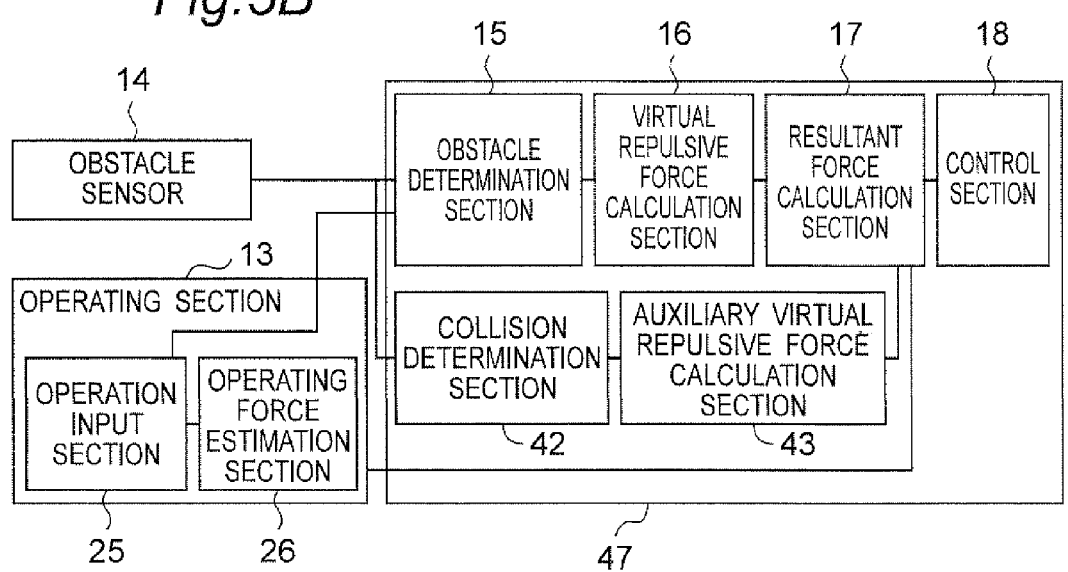
FIG. 5B is a block diagram of an operating section and a control section of the electric wheelchair according to the third embodiment.

FIGS. 5A and 55 are views showing an electric wheelchair 41 according to a third embodiment of the present invention. FIG. 5A is a view showing the electric wheelchair 41 which is coming close to an obstacle, and FIG. 53 is a block diagram of an operating section and a control section.

The electric wheelchair 41 according to the third embodiment includes a control circuit section 47 instead of the control circuit section 27 of the electric wheelchair 11 according to the first embodiment. The control circuit section 47 further includes a collision determination section 42 and an auxiliary virtual repulsive force calculation section 43 in addition to the configuration of the control circuit section 27. The resultant force calculation section 17 calculates a resultant force composed of an operating force, a virtual repulsive force, and an auxiliary virtual repulsive force.

Thus, according to the electric wheelchair 41 of the third embodiment, in addition to the search region 21 to detect the static obstacle, a bumper region 45 is formed to detect whether or not the static obstacle or the dynamic obstacle exists in a peripheral part of the body portion 12 by the collision determination section 42, so that the body portion 12 can be prevented from colliding with the obstacle which is not detected in the search region 21 or the dynamic obstacle search region 35. The bumper region 45 which is smaller than the obstacle sensor region 20 is formed by the collision determination section 42 as a quadrilateral region near the body portion 12 except for the search region 21.

The electric wheelchair 41 according to the third embodiment further includes the collision determination section 42 and the auxiliary virtual repulsive force calculation section 43 in addition to the configuration of the electric wheelchair 11 according to the first embodiment. Thus, the collision determination section 42 forms the bumper region 45 around the body portion 12 except for the search region 21, and determines the obstacle detected in the bumper region 45 as the obstacle which could collide with the electric wheelchair 41. The auxiliary virtual repulsive force calculation section 43 calculates a virtual repulsive force which is inversely proportional to a distance to the obstacle and generated in a direction opposite to the obstacle. With respect to the obstacle detected in the bumper region 45, the virtual repulsive force which is calculated by the auxiliary virtual repulsive force calculation section 43 is greater than the virtual repulsive force calculated with respect to the static obstacle or the dynamic obstacle detected in the search region 21 and the dynamic obstacle search region 35, respectively. Thus, based on the virtual repulsive force generated by the auxiliary virtual repulsive force calculation section 43, the control section 18 controls the operation of the electric wheelchair 11 through the resultant force calculation section 17, so that the body portion 12 can be surely prevented from colliding with the obstacle.

Here, since the search region 21 only exists in the operating direction, the body portion 12 could collide with the obstacle when the obstacle exists in a direction other than the operating direction, depending on the situation. For example, as shown in FIG. 5A, when the operation input portion 25 is handled to the left in FIG. 5A while the body portion 12 is about to pass through an obstacle 44, the obstacle 44 cannot be detected in the search region 21. However, since the bumper region 45 is formed, the fact that obstacle 44 exists around the body portion 12 except for the search region 21 can be detected by the obstacle determination section 42. Thus, even when the obstacle 44 cannot be detected in the search region 21 by the obstacle determination section 15, the obstacle 44 can be detected in the bumper region 45 by the collision determination section 42, so that the electric wheelchair 41 is prevented from colliding with the obstacle 44.

Thus, according to the electric wheelchair 41, the obstacle which cannot be detected in the search region 21 by the obstacle determination section 15 can be detected in the bumper region 45 by the collision determination section 42. In this case, the control section 18 controls the operation of the electric wheelchair 41 so that the electric wheelchair 41 can avoid the obstacle, so that the collision with the obstacle can be prevented.

In addition, when the obstacle is detected in the bumper region 45 by the collision determination section 42, a moving speed of the electric wheelchair 41 may be limited, or the electric wheelchair 41 may be prohibited from moving toward the detected obstacle by the control section 18 in order to secure high safety. In addition, a notification device may be separately provided, and the operator may be notified of the information by a warning alarm or LED lighting as one example of a function of the notification device under the control of the control section 18. When the notification device is separately provided, the operator can be notified of the fact that the body portion is about to contact with the obstacle, so that the operator can easily operate the electric vehicle.

Fourth Embodiment

Figure 6A:
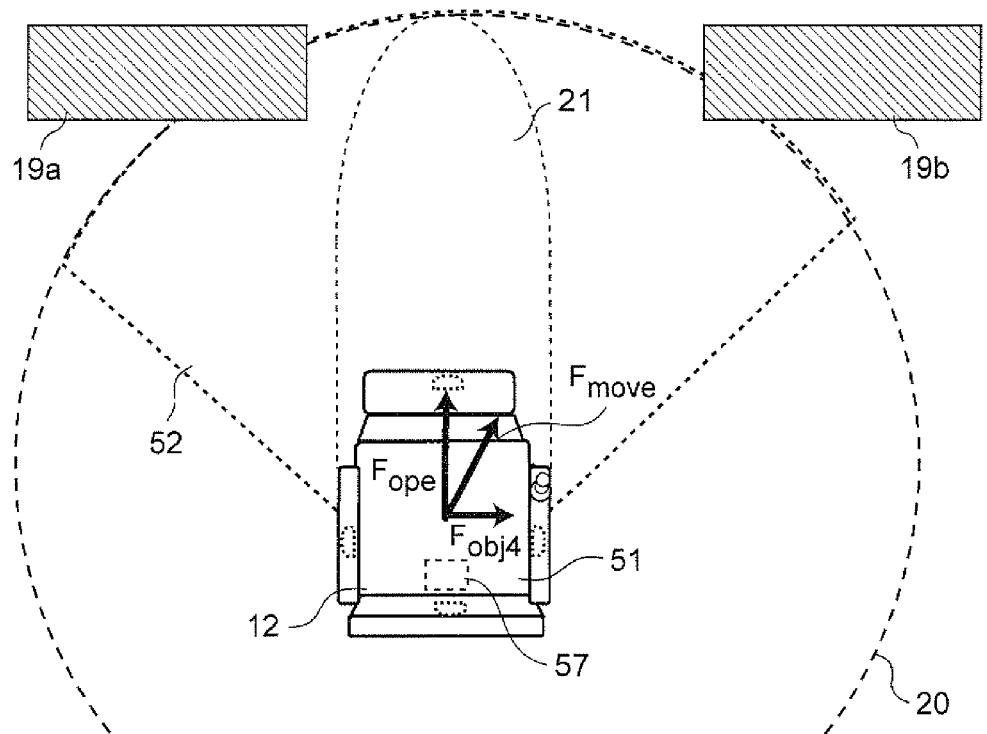
FIG. 6A is a view showing a state in which an electric wheelchair according to a fourth embodiment of the present invention is about to pass between an obstacle and an obstacle.
Figure 6B:
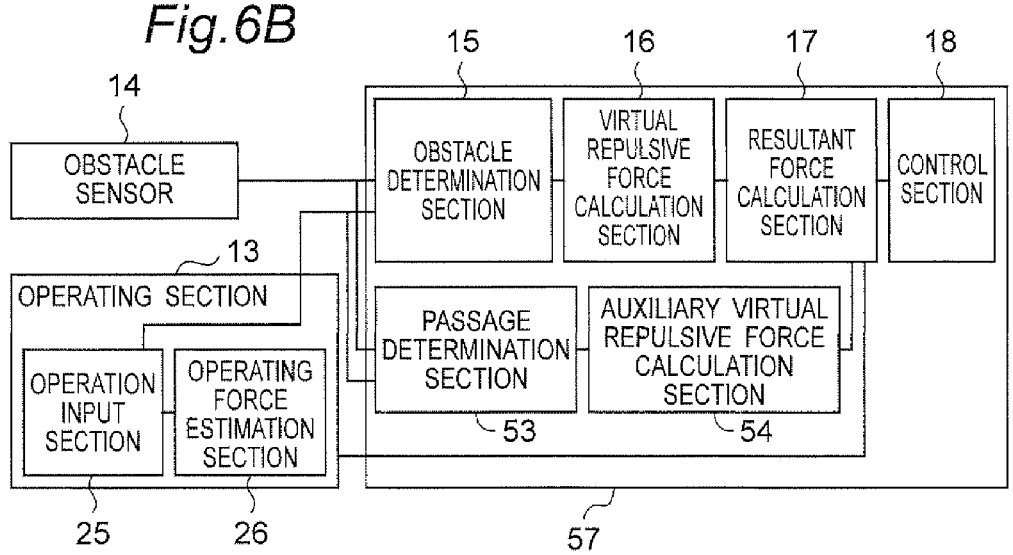
FIG. 6B is a block diagram of an operating section and a control section of the electric wheelchair according to the fourth embodiment.

FIGS. 6A and 6B are views showing an electric wheelchair 51 according to a fourth embodiment of the present invention. FIG. 6A is a view showing the electric wheelchair 51 which is about to pass between the obstacle 19a and the obstacle 19b, and FIG. 6B is a block diagram of an operating section and a control section.

The electric wheelchair 51 according to the fourth embodiment includes a control circuit section 57 instead of the control circuit section 27 of the electric wheelchair 11 according to the first embodiment. The control circuit section 57 further includes a passage determination section 53 and an auxiliary virtual repulsive force calculation section 54 in addition to the configuration of the control circuit section 27. The resultant force calculation section 17 calculates the resultant force composed of an operating force, a virtual repulsive force, and an auxiliary virtual repulsive force.

Thus, according to the electric wheelchair 51 of the fourth embodiment, a passage detection region 52 is formed by the passage determination section 53 in addition to the search region 21 to detect the obstacle, so that when the electric wheelchair 51 passes between the obstacle 19a and the obstacle 19b, the electric wheelchair 51 can be guided to a center of a passage and pass between the obstacle 19a and the obstacle 19b safely. Here, the passage detection region 52 is a roughly fan-shaped region which spreads from a front half part of the body part 12 to an edge part of the obstacle sensor region 20 in the operating direction.

That is, when the electric wheelchair 51 is about to pass between the obstacle 19a and the obstacle 19b, the electric wheelchair 51 detects the obstacles 19a and 19b existing in the passage detection region 52 by the passage determination section 53. Thus, when the body portion 12 comes too close to the one obstacle 19a, a virtual repulsive force $F_{obj4}$ from the one obstacle 19a to the other obstacle 19b is calculated by the auxiliary virtual repulsive force calculation section 54, and the electric wheelchair 51 is guided to the center position between the obstacle 19a and the obstacle 19b by the control section 18 through the resultant force calculation section 17. Here, the term "guiding" means that after the above virtual repulsive force has been calculated, the movement of the electric wheelchair 51 is controlled, and the movement of the electric wheelchair 51 is guided. When guided in this way, the electric wheelchair 51 can pass between the two obstacles 19a and 19b more safely.

The passage determination section 53 forms the passage detection region 52 which is the roughly fan-shaped region and spreads from the body portion 12 to the edge part of the obstacle sensor region 20 in the operating direction. When there are at least two obstacles in the passage detection region 52, and the search region 21 is set between the two obstacles 19a and 19b, the passage determination section 53 determines that the region between the two obstacles 19a and 19b is the passage to guide the electric wheelchair 51. More specifically, after the two obstacles 19a and 19b have been detected in the passage detection region 52, when the search region 21 provided based on the information of the operating direction from the operating section 13 is set between the two obstacles 19a and 19b, it is determined that the electric wheelchair 51 is to be guided to the passage.

In order to guide the electric wheelchair 51, the auxiliary virtual repulsive force calculation section 54 calculates the auxiliary virtual repulsive force $F_{obj4}$, based on how much the search region 21 is shifted from the center of a gap between the two obstacles 19a and 19b. In order to perform the guide the electric wheelchair 51 with respect to the obstacle recognized by the operator, the passage detection region 52 is formed by the passage determination section 53 as a region which spreads from the operating direction to right and left by 45°. Here, the right and left of the passage detection region 52 is set within the range of 45° because a human stable gaze viewing field is within 45° right and left, so that the operator can easily gaze at a target (obstacle) with a head part moved. In addition, the auxiliary virtual repulsive force $F_{obj4}$ is the resultant force obtained by setting two virtual repulsive forces which are inversely proportional to distances to two obstacles, and generated in the directions opposite to each of the two obstacles, and combining their vertical components with respect to the operating direction. That is, the auxiliary virtual repulsive force only acts in the vertical direction with respect to the operating direction, so that the electric wheelchair 51 is only guided in the vertical direction with respect to its moving direction. Thus, the electric wheelchair 51 can be guided to between the two obstacles 19a and 19b so that the moving operation in the operating direction designated by the operator is not hindered. The resultant force calculation section 17 calculates the resultant force composed of the vertical component of the auxiliary virtual repulsive force with respect to the direction of the operating force, and the operating force. The control section 18 controls the drive source 70 so that the body portion 12 moves in the direction of the resultant force calculated by the resultant force calculation section 17. Here, the auxiliary virtual repulsive force is calculated by the auxiliary virtual repulsive force calculation section 54, based on the virtual repulsive force generated for at least one obstacle.

As shown in FIG. 6A, after the two obstacles 19a and 19b have been detected in the passage detection region 52, when the search region 21 based on the information of the operating direction from the operating section 13 is set between the two obstacles 19a and 19b, the electric wheelchair 51 may be closer to the obstacle 19a. That is, the search region 21 of the electric wheelchair 51 may be closer to the one obstacle 19a when the electric wheelchair is about to pass between the obstacle 19a and the obstacle 19b. Whether or not the electric wheelchair 51 is closer to the one obstacle 19a can be determined by calculating the resultant force composed of the virtual repulsive forces generated depending on the distances to the obstacles, and finding a direction of the resultant force of the virtual repulsive force generated in a direction from the closer obstacle to the distant obstacle. In this case, the auxiliary virtual repulsive force $F_{obj4}$ calculated by the auxiliary virtual repulsive force calculation section 54 acts in the direction from the one obstacle 19a to the other obstacle 19b. As a result, the electric wheelchair 51 is guided based on the calculated result by the auxiliary virtual repulsive force calculation section 54, so that the center axis of the search region 21 is positioned on the center of the gap between the obstacle 19a and the obstacle 19b by the auxiliary virtual repulsive force $F_{obj4}$. Thus, after the center axis of the search region 21 has been positioned on the center of the gap between the obstacle 19a and the obstacle 19b, the auxiliary virtual repulsive force calculation section 54 stops calculating the auxiliary virtual repulsive force $F_{obj4}$.

In addition, when there is only one obstacle in the passage detection region 52, or when the search region 21 does not penetrate the space between the two or more obstacles, the passage determination section 53 of the fourth embodiment may determine that the object is to be avoided. In this case, avoidance guiding is only performed in the vertical direction with respect to the operating direction in order to avoid the obstacle. Thus, the avoidance guiding can be performed without preventing the movement in the operating direction designated by the operator. In addition, as shown in FIG. 6A, the passage determination section 53 may set the passage detection region 52 as a region in which at least one of a width and a length is larger than that of the search region 21. In this case, the guiding or avoidance guiding is performed for the obstacle existing in the passage detection region 52 except for the search region 21.

In addition, when the fourth embodiment is combined with the variation of the first embodiment shown in FIG. 1C, the resultant speed calculation section 17A calculates the resultant speed by combining the vertical component of the virtual avoidance speed with respect to the direction of the operating speed, and the operating speed. Here, the virtual avoidance speed is generated for at least one obstacle. The control section 18 controls the electric wheelchair 51 so that the electric wheelchair 51 is moved in the direction of the resultant speed calculated by the resultant speed calculation section 17A.

Fifth Embodiment

Figure 7A:
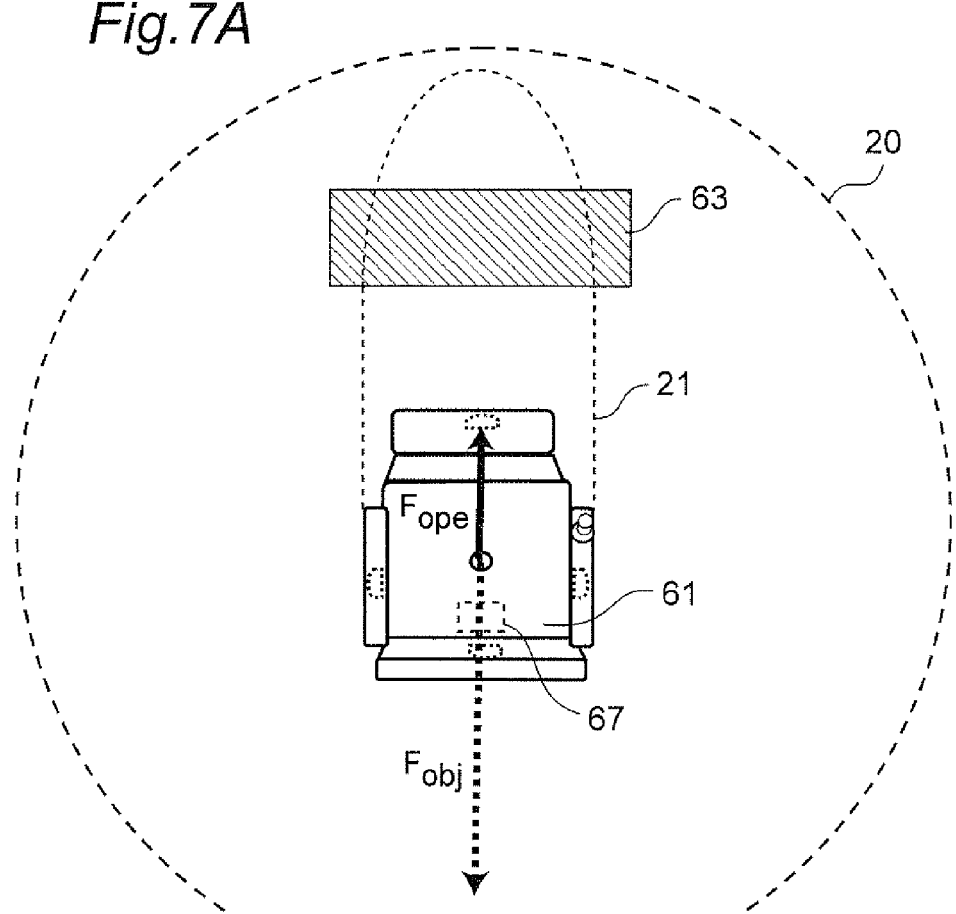
FIG. 7A is a view showing a state in which an electric wheelchair according to a fifth embodiment of the present invention is coming close to an obstacle.
Figure 7B:
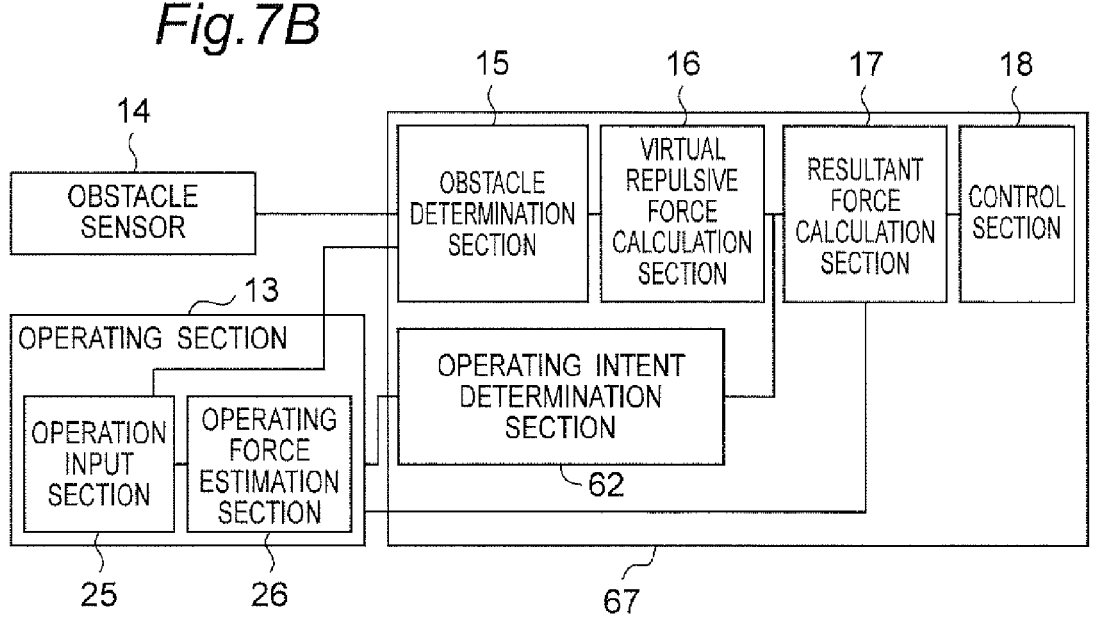
FIG. 7B is a block diagram of an operating section and a control section of the electric wheelchair according to the fifth embodiment.
Figure 8:
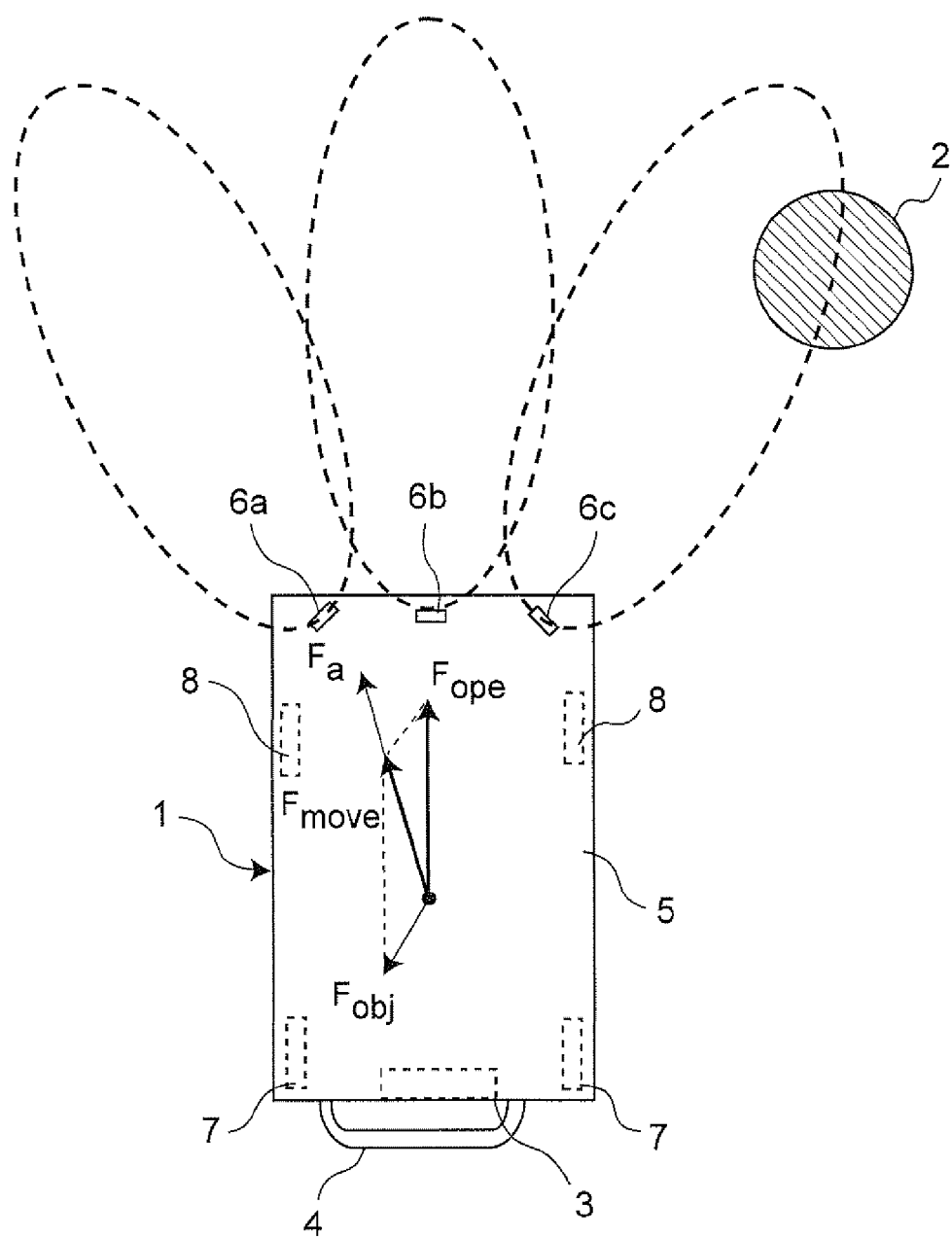
FIG. 8 is a view showing a conventional power assisted cart to avoid an obstacle.
Figure 9:
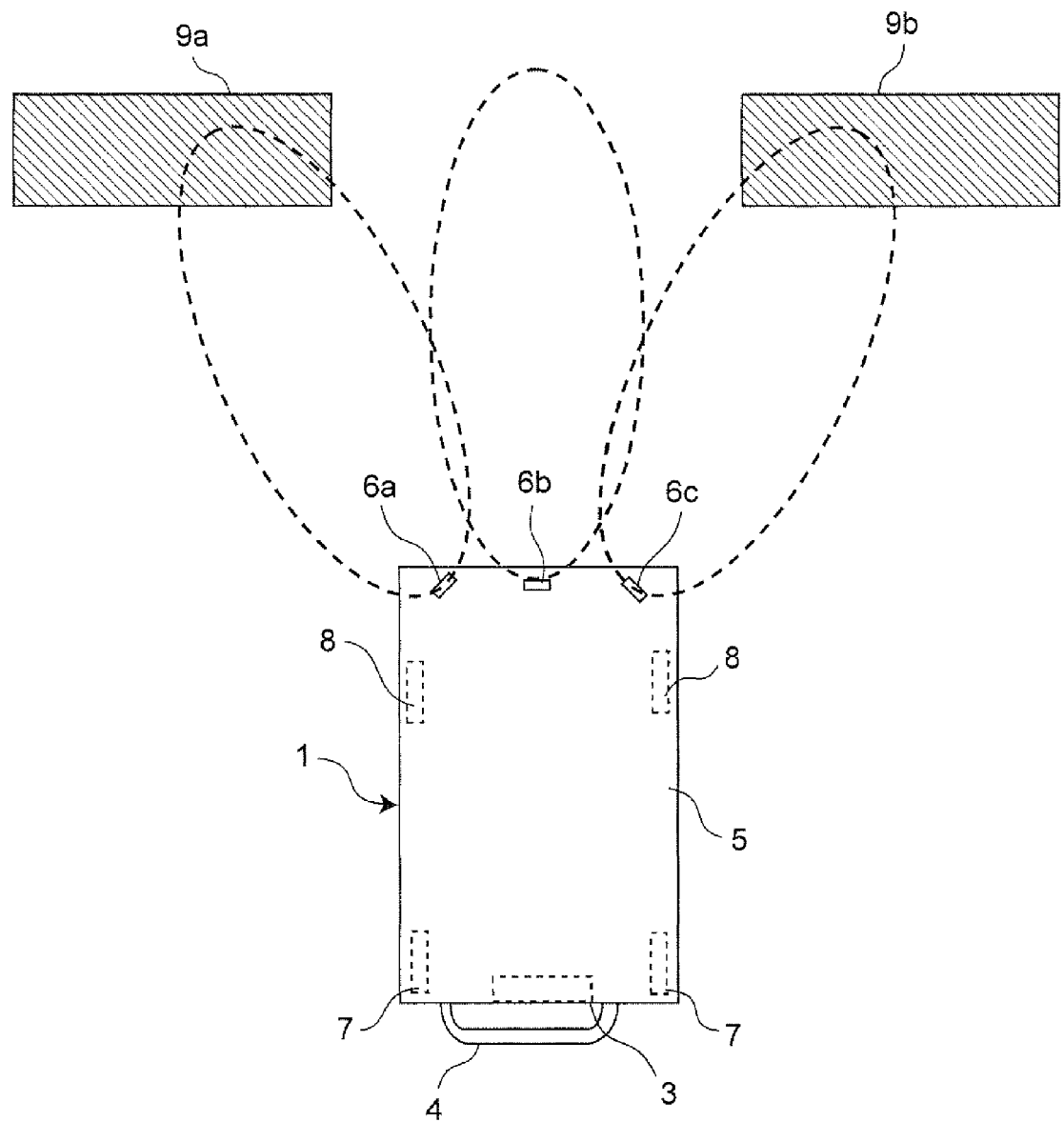
FIG. 9 is a view showing the conventional power assisted cart which is about to pass between an obstacle and an obstacle.

FIGS. 7A and 7B are views showing an electric wheelchair 61 according to a fifth embodiment of the present invention. FIG. 7A is a view showing the electric wheelchair 61 which is coming close to an obstacle 63, and FIG. 7B is a block diagram of an operating section and a control section.

The electric wheelchair 61 according to the fifth embodiment includes a control circuit section 67 instead of the control circuit section 27 in the electric wheelchair 11 according to the first embodiment. The control circuit section 67 includes an operating intent determination section 62 in addition to the configuration of the control circuit section 27. The operating intent determination section 62 prevents the resultant force calculation section 17 from using the virtual repulsive force calculated by the virtual repulsive force calculation section 16 when the operator intends to come close to the obstacle 63, so that the electric wheelchair 61 can come close to the obstacle.

For example, the target object includes a shelf, a desk, or a bed. When the electric wheelchair 11 according to the first embodiment intends to come close to the target object, the electric wheelchair 11 cannot come close to the target object according to the configuration in which the virtual repulsive force is generated for any object provided in the operating direction of the body portion 12 as described above. That is, the electric wheelchair 11 according to the first embodiment is configured not to come close to any object, so that the electric wheelchair 11 cannot come close to a shelf, a desk, or a bed. Thus, the electric wheelchair 11 according to the first embodiment is sometimes inconvenient in a daily life.

Thus, the electric wheelchair 61 of the fifth embodiment is configured to be able to come close to the obstacle when the operator intends to come close to the obstacle 63. Thus, according to the electric wheelchair 61 of the fifth embodiment, in a case where a direction of the virtual repulsive force $F_{obj}$ and a direction of the operating force $F_{ope}$ are roughly opposite for a predetermined time, the operating intent determination section 62 determines that the operator intends to come close to the obstacle 63. In this case, based on the control of the control section 18, the moving speed is limited, and the electric wheelchair 61 is permitted to move toward the obstacle.

The operating intent determination section 62 compares the direction of the virtual repulsive force with the operating direction, and the operating intent determination section 62 changes the control of the movement of the body portion 12 in the case where the direction of the virtual repulsive force and the operating direction are roughly opposite to each other for the predetermine time. More specifically, the operating intent determination section 62 determines that the operator intends to come close to the obstacle 63 in a case where an angle formed between the direction of the operating force $F_{ope}$ from the operating section 13 and a 180-degree opposite direction of the virtual repulsive force $F_{obj}$ from the virtual repulsive force calculation section 16 is within 30° for the predetermine time, limits the magnitude of the virtual repulsive force calculated by the virtual repulsive force calculation section 16, and permits the movement toward the obstacle. The angle range to permit the movement is set to 30°, based on a human effective viewing angle in which a target can be caught only with an eye movement and the target can be admitted. In addition, this angle to permit the movement may be optionally set depending on the skill and usability of the permitted operator.

Thus, when the operating intent determination section 62 determines that the operator intends to come close to the obstacle 63, the magnitude of the virtual repulsive force $F_{obj}$ is limited by the operating intent determination section 62, and the electric wheelchair 61 can come close to the obstacle 63 under the control of the control section 18.

In addition, when the operating intent determination section 62 determines that the operator intends to come close to the obstacle 63, the calculation of the virtual repulsive force by the virtual repulsive force calculation section 16 may be stopped, and the electric wheelchair 61 may be permitted to move toward the obstacle 63 with its moving speed limited.

In addition, as the condition to determine the intension of the operator by the operating intent determination section 62, the angle formed between the direction of the operating force $F_{ope}$ and the 180-degree opposite direction of the virtual repulsive force $F_{obj}$ is within 30° for the predetermined time as described above, and this predetermined time is preferably longer than one second. The time is set longer than one second because even if the condition that the angle formed between the direction of the operating force $F_{ope}$ and the 180-degree opposite direction of the virtual repulsive force $F_{obj}$ is within 30° is established due to an erroneous operation of the operation input portion 25 by the operator, a time such as one second is required for the operator to correct the direction of the operating force $F_{ope}$ immediately after noticing the erroneous operation. Thus, the predetermined time is set to be longer than one second.

In addition, an operation switch may be provided and used such that while the operation switch is pressed by the operator, the magnitude of the virtual repulsive force is limited (or calculation of the virtual repulsive force is stopped), and the electric wheelchair 61 is permitted to move toward the obstacle with its moving speed limited. In a case where an operator can use both hands freely, the operation switch may be provided. Meanwhile, in a case where an operator cannot use only one hand, it is necessary to determine the intension of the operator by the operating intent determination section 62.

In addition, when the fifth embodiment is combined with the variation of the first embodiment shown in FIG. 1C, the operating intent determination section 62 compares the direction of the virtual avoidance speed with the operating direction, and changes the control of the movement of the body portion 12 in the case where the direction of the virtual avoidance speed and the operating direction are roughly opposite for a predetermined time. More specifically, the operating intent determination section 62 changes the control of the movement of the body portion 12 in the case where the angle between the 1.80-degree opposite direction of the virtual avoidance speed and the operating direction is within 30° for the predetermined time.

By properly combining the arbitrary embodiments and/or any variations of the aforementioned various embodiments and any variations, the effects possessed by the embodiments and/or any variations can be produced.

According to the electric vehicle and the method for controlling it according to the present invention, the electric vehicle can smoothly pass between the obstacles, and highly-practical operation can be implemented. Therefore, they can be applied to an electric vehicle operated based on the operation of the operator, such as an electric wheelchair, a power assisted cart, or a shopping cart, and a method for controlling it.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electric vehicle comprising:
    a body portion;
    an operating section that detects an operating direction and an operating amount of an inputted operation;
    an obstacle sensor that detects obstacles existing in a vicinity of the body portion;
    an obstacle determination section that forms a search region extending from the body portion in the operating direction and determines an obstacle existing in the search region among the obstacles detected by the obstacle sensor as an obstacle to be avoided; and
    a control section that controls a movement of the body portion so that the body portion avoids the obstacle to be avoided determined by the obstacle determination section, wherein
    the obstacle determination section changes a shape of the search region depending on a magnitude of the operating amount or a magnitude of an operating force calculated based on the operating direction and the operating amount,
    the electric vehicle further comprises:
        a virtual repulsive force calculation section that calculates a virtual repulsive force to move the body portion away from the obstacle to be avoided determined by the obstacle determination section; and
        a resultant force calculation section that calculates a resultant force composed of the operating force calculated based on the operating direction and the operating amount of the inputted operation, and the virtual repulsive force, and
    the control section controls the movement of the body portion so that the body portion moves in a direction of the resultant force.

2. The electric vehicle according to claim 1, wherein the resultant force calculation section calculates the resultant force by combining the virtual repulsive force in a direction perpendicular to a direction of the operating force, and the operating force.

3. The electric vehicle according to claim 1, further comprising:
    a virtual avoidance speed calculation section that calculates a virtual avoidance speed to move the body portion away from the obstacle to be avoided determined by the obstacle determination section; and
    a resultant speed calculation section that calculates a resultant speed composed of an operating speed calculated based on the operating direction and the operating amount of the inputted operation, and the virtual avoidance speed, wherein
    the control section controls the movement of the body portion so that the body portion moves in a direction of the resultant speed.

4. The electric vehicle according to claim 3, wherein the resultant speed calculation section calculates the resultant speed by combining the virtual avoidance speed in a direction perpendicular to a direction of the operating speed, and the operating speed.

5. The electric vehicle according to claim 3, further comprising:

a passage determination section that defines a passage detection region spreading from the body portion in the operating direction excluding the search region, and determines a space between two obstacles as a passage to guide the body portion when the two obstacles are detected in the passage detection region and the search region is generated between the two obstacles, wherein the resultant speed calculation section calculates the resultant speed by combining the virtual avoidance speed generated for each of the two obstacles in a direction perpendicular to a direction of the operating speed, and the operating speed.

6. The electric vehicle according to claim 3, further comprising:

a passage determination section that defines a passage detection region spreading from the body portion in the operating direction excluding the search region, and determines an obstacle existing in the passage detection region as an obstacle to be avoided, wherein the resultant speed calculation section calculates the resultant speed by combining the virtual avoidance speed generated for the obstacle existing in the passage detection region in a direction perpendicular to a direction of the operating speed, and the operating speed.

7. The electric vehicle according to claim 3, further comprising:

an operating intent determination section that compares a direction of the virtual avoidance speed and the operating direction, and changes control of the movement of the body portion when the direction of the virtual avoidance speed and the operating direction are roughly opposite for a predetermined time.

8. The electric vehicle according to claim 7, wherein the operating intent determination section changes the control of the movement of the body portion when an angle formed between a 180-degree opposite direction of the virtual avoidance speed and the operating direction is within 30° for the predetermined time.

9. The electric vehicle according to claim 1, further comprising:

a dynamic obstacle determination section that forms a dynamic obstacle search region in the vicinity of the body portion, and determines a dynamic obstacle existing in the dynamic obstacle search region as an obstacle to be avoided, wherein the control section controls the movement of the body portion so that the body portion avoids the obstacle to be avoided determined by the dynamic obstacle determination section.

10. The electric vehicle according to claim 1, further comprising:

a collision determination section that defines a bumper region around the body portion excluding the search region, and determines an obstacle existing in the bumper region as an obstacle to be avoided, wherein the control section controls the movement of the body portion so that the body portion avoids the obstacle to be avoided determined by the collision determination section.

11. The electric vehicle according to claim 1, further comprising:

a passage determination section that defines a passage detection region spreading from the body portion in the operating direction excluding the search region, and determines a space between two obstacles as a passage to guide the body portion when the search region is generated between the two obstacles existing in the passage detection region, wherein the control section controls the movement of the body portion so that the body portion passes through a center of the passage determined as the passage to guide the body portion by the passage determination section.

12. The electric vehicle according to claim 11, wherein the passage detection region is larger in width, or larger in width and length than the search region.

13. The electric vehicle according to claim 1, further comprising:

a passage determination section that defines a passage detection region spreading from the body portion in the operating direction excluding the search region, and determines a space between two obstacles as a passage to guide the body portion when the two obstacles are detected in the passage detection region and the search region is generated between the two obstacles, wherein the resultant force calculation section calculates the resultant force by combining the virtual repulsive force generated for each of the two obstacles in a direction perpendicular to a direction of the operating force, and the operating force.

14. The electric vehicle according to claim 1, further comprising:

a passage determination section that defines a passage detection region spreading from the body portion in the operating direction excluding the search region, and determines an obstacle existing in the passage detection region as an obstacle to be avoided, wherein the resultant force calculation section calculates the resultant force by combining the virtual repulsive force generated for the obstacle existing in the passage detection region in a direction perpendicular to a direction of the operating force, and the operating force.

15. The electric vehicle according to claim 1, further comprising:

an operating intent determination section that compares a direction of the virtual repulsive force and the operating direction, and changes control of the movement of the body portion when the direction of the virtual repulsive force and the operating direction are roughly opposite for a predetermined time.

16. The electric vehicle according to claim 12, wherein the operating intent determination section changes the control of the movement of the body portion when an angle formed between a 180-degree opposite direction of the virtual repulsive force and the operating direction is within 30° for the predetermined time.

17. The electric vehicle according to claim 1, wherein the obstacle determination section forms the search region extending from the body portion in the operating direction and having roughly a same width as that of the body portion.

18. A method for controlling an electric vehicle having an obstacle sensor and an operating section, comprising:

detecting obstacles existing in a vicinity of a body portion using the obstacle sensor;

detecting an operating direction and an operating amount of an inputted operation using the operating section;

forming a search region extending from the body portion in the operating direction using an obstacle determination section, and determining an obstacle existing in the search region among the obstacles detected using the obstacle sensor as an obstacle to be avoided using the obstacle determination section; and controlling a movement of the body portion using a control section so that the body portion avoids the obstacle to be avoided, wherein a shape of the search region formed using the obstacle determination section is changed depending on a magnitude of the operating amount or a magnitude of an operating force calculated based on the operating direction and the operating amount, the method further comprises:

calculating a virtual repulsive force to move the body portion away from the obstacle to be avoided determined using the obstacle determination section; and calculating a resultant force composed of the operating force calculated based on the operating direction and the operating amount, and the virtual repulsive force, and the movement of the body portion is controlled using the control section so that the body portion moves in a direction of the resultant force.

\* \* \* \* \*